US012310902B2

(12) United States Patent
Qu et al.

(10) Patent No.: US 12,310,902 B2
(45) Date of Patent: May 27, 2025

(54) CHAIR WITH AN ELASTIC LIFTING SEAT PAN

(71) Applicant: Shanghai Respecting Intelligence Technology Co., Ltd., Shanghai (CN)

(72) Inventors: Xinde Qu, Shanghai (CN); Jun Wang, Shanghai (CN); Jian Ke, Shanghai (CN)

(73) Assignee: Shanghai Respecting Intelligence Technology Co., Ltd., Shanghai (CN)

( * ) Notice: Subject to any disclaimer, the term of this patent is extended or adjusted under 35 U.S.C. 154(b) by 260 days.

(21) Appl. No.: 18/200,598

(22) Filed: May 23, 2023

(65) Prior Publication Data

US 2023/0390131 A1 Dec. 7, 2023

(30) Foreign Application Priority Data

Jun. 1, 2022 (CN) ......................... 202210621665.9
Apr. 20, 2023 (CN) ......................... 202310424139.8

(51) Int. Cl.
*A61G 5/14* (2006.01)
*A47C 7/56* (2006.01)

(52) U.S. Cl.
CPC ................ *A61G 5/14* (2013.01); *A47C 7/566* (2013.01)

(58) Field of Classification Search
CPC .................................. A61G 5/14; A47C 7/566
See application file for complete search history.

(56) References Cited

U.S. PATENT DOCUMENTS 5,082,327 A * 1/1992 Crisp ........................ A61G 5/14
297/DIG. 10
5,333,931 A * 8/1994 Weddendorf ............ A61G 5/14
297/DIG. 10

(Continued)

FOREIGN PATENT DOCUMENTS

CN 103099579 A 5/2013
CN 104306117 A 1/2015

(Continued)

OTHER PUBLICATIONS

International Search Report (ISR) of the corresponding PCT/CN2023/095473 application, English version, dated Sep. 28, 2023.

(Continued)

*Primary Examiner* — Timothy J Brindley
(74) *Attorney, Agent, or Firm* — Chiwin Law LLC

(57) ABSTRACT

The present invention application relates to a chair with an elastic lifting seat pan, which comprises a chair body, a transmitting component, a driving component, and a seat pan firmly connecting plane connecting seat of a pair of link plates of the transmitting component. When the user is seated on the seat pan, the torsion spring is deformed with the rotation of the spindle, accumulating elastic potential energy and damping the descent of the seat pan. When the user stands up from the seat pan, the torsion spring releases the elastic potential energy to drive the spindle reversely and help the user to stand up. The chair with an elastic lifting seat pan according to the embodiment of the present invention application can be used to help the elderly and the weak people, and also to relax in public places and leisure places to reduce fatigue.

13 Claims, 5 Drawing Sheets

(56) References Cited

U.S. PATENT DOCUMENTS

| | | | | |
|---|---|---|---|---|
| 2013/0093230 | A1* | 4/2013 | Yu | A61G 5/14 297/330 |
| 2020/0155391 | A1* | 5/2020 | Morgan | A61G 5/1035 |
| 2020/0237592 | A1* | 7/2020 | Chu | A61G 5/14 |
| 2020/0237593 | A1* | 7/2020 | Chu | A61G 7/1059 |
| 2023/0210704 | A1* | 7/2023 | Brown | A61G 5/14 297/339 |

FOREIGN PATENT DOCUMENTS

| | | | | | |
|---|---|---|---|---|---|
| CN | 204170010 | U | | 2/2015 | |
| CN | 108095391 | A | * | 6/2018 | A47C 1/00 |
| CN | 110448086 | A | | 11/2019 | |
| CN | 111557804 | A | * | 8/2020 | |
| CN | 112190056 | A | * | 1/2021 | A47C 7/14 |
| CN | 112451235 | A | * | 3/2021 | |
| CN | 112932824 | A | * | 6/2021 | A61G 5/1045 |
| CN | 113786293 | A | * | 12/2021 | |
| CN | 115137622 | A | * | 10/2022 | A61B 5/024 |
| CN | 115227054 | A | | 10/2022 | |
| EP | 1310227 | A2 | * | 5/2003 | A61G 5/14 |
| KR | 102526600 | B1 | * | 4/2023 | |
| WO | WO-2012011111 | A1 | * | 1/2012 | A61G 5/14 |
| WO | 2016173655 | A1 | | 11/2016 | |
| WO | WO-2019124974 | A1 | * | 6/2019 | A61G 5/14 |
| WO | WO-2022139669 | A1 | * | 6/2022 | A47C 7/02 |

OTHER PUBLICATIONS

Written Opinion of the corresponding PCT/CN2023/095473 application, English version, dated Sep. 28, 2023.

* cited by examiner

B-B

CHAIR WITH AN ELASTIC LIFTING SEAT PAN

TECHNICAL FIELD

The present invention application relates to a chair, and more specifically to a chair with an elastic lifting seat pan.

BACKGROUND

In daily life, elderly and infirm people often need assistance of caretakers to stand up from and to sit down on the regular seats, which brings inconvenience to their lives, and also causes mental stress and physical exhaustion of the caretakers.

In recent years, in order to adapt to the actual needs of people's daily life, all kinds of medical care chairs and walking chairs are in intensive development and production.

However, it still needs to be developed further to make seat surface more bionic, while helping users to sit down on and to stand up from a chair more conveniently, in order to better serve the actual needs of the users.

SUMMARY

The technical problem to be solved by the present invention application is to provide a seat capable of making the seat surface bionic and assisting the user's sitting conveniently.

In accordance with the present invention application, to solve the above technical problems, there is provided a chair with an elastic lifting seat pan which comprises a chair body including a baseplate, a left armrest and a right armrest firmly connecting with the baseplate respectively, a backrest firmly connecting with the baseplate and the left armrest and the right armrest, and chair legs and feet supporting the baseplate; a transmitting component including a pair of hinge holders respectively extending up from the baseplate at two corners of the baseplate near the chair back on left side and right side, firmly connecting with the baseplate respectively, each of which has an upper hinge seat and a lower hinge seat; a pair of driving links, each of which is joined with the lower hinge seat at one end by a hinge respectively and the hinge is a key-in hinge; a pair of guiding links, each of which is joined with the upper hinge seat at one end by a hinge respectively, and a pair of link plates, each of which has an upper hinge seat and a lower hinge seat, each of the two upper hinge seats is joined with the other end of each guiding links by a hinge respectively, each of the two lower hinge seats is joined with the other end of each driving links by a hinge respectively, and each of the link plates includes a plane connecting seat on its upside; a driving component including a chassis plate to be firmly connected to the pair of hinge holders of the transmitting component with a pair of holders vertically extending from a surface of the chassis plate in which an circular curved slider is provided; a cross beam provided to plug into the circular curved sliders of the holders at its two ends so as to slide down along the circular curved slider; at least one torsion spring arranged between the pair of holders, having a central end with a central hole and a peripheral end firmly connected with the cross beam by a hook joint; and a spindle inserting into the central hole of the torsion spring to form a key connection with the torsion spring therebetween, and to form a coaxial mechanical connection at its two ends with the hinge axles of the lower hinge seats in the transmitting component; and a seat pan having a shape to fit the chair body and attached with the plane connecting seat of the pair of link plates in the transmitting component. When the user is seated on the seat pan, the torsion spring is deformed with the rotation of the spindle, accumulating elastic potential energy and damping the descent of the seat pan; and when the user stands up from the seat pan, the torsion spring releases the elastic potential energy to drive the spindle reversely and help the user to stand up.

According to an embodiment of the present invention application, the spindle in the driving component may be rectangular in cross section, and the central hole of the torsion spring may also be rectangular, and thus a self-aligned structure may be formed therebetween after the spindle is inserted into the torsion spring.

According to an embodiment of the present invention application, the hinge shaft hinge joining with the driving links of the transmitting component and the hinge seats may include a coaxial short axis having a rectangular groove to receive the end of the spindle.

According to an embodiment of the present invention application, there may be a plurality of torsion springs uniformly arranged along the spindle. Preferably, the number of the torsion springs may be an even number, symmetrically arranged with the midline of the spindle as the axis.

According to an embodiment of the present invention application, the chair with an elastic lifting seat pan may also include a torsional force adjustment mechanism for adjusting torsional force of the torsion spring or springs. The torsional force adjustment mechanism may include an adjusting bolt provided at middle of the spindle behind the chassis plate against the chassis plate and connecting the cross beam through a thread connection.

According to an embodiment of the present invention application, the chair with an elastic lifting seat pan may also include a self-lubricating shaft and a self-lubricating shaft sleeve covering thereon. The self-lubricating shaft is provided parallel to the spindle between the spindle and the chassis plate, the two ends of the self-lubricating shaft are fixed with the chassis plate, when the center of the outer ring even one or more its neighboring rings deviates the axis of the spindle due to excessive force. The self-lubricating shaft sleeve can match against the torsion spring outer ring to avoid its excessive deformation which may cause causing friction of the neighboring rings.

According to an embodiment of the present invention application, the chair with an elastic lifting seat pan may also include a tensile damping spring provided between the front edge of the baseplate and the pair of driving links. Preferably, each of the driving links may include a channel and a slider received in the channel, and the tensile damping spring may be connected to the driving links by the slider.

According to an embodiment of the present invention application, the chair with an elastic lifting seat pan may also include two stop pins provided in the hinge seats as an upper limit of the driving links and two soft adhesive pad limit blocks provided on the upper surface of the baseplate corresponding to the positions of the driving links.

According to an embodiment of the present invention application, the seat pan may have an upper surface with a curved surface shaped of bionic human hips.

According to an embodiment of the present invention application, the chair with an elastic lifting seat pan may also include flexible cover surrounding the seat pan and baseplate and surrounding the space between them.

According to an embodiment of the present invention application, a lifting height of the seat pan from the lowest to the highest position may be 10-30 cm, and an angle of the seat pan from the lowest to the highest position may be 20° to 35°.

Compared with the prior art, the chair with an elastic lifting seat pan according to embodiments of the present invention application has at least the following beneficial technical effects.

The chair with an elastic lifting seat pan according to an embodiment of the present invention application may comprise a chair body, a transmitting component, a driving component and a seat pan. When the user is seated on the seat pan, the torsion spring is deformed with the rotation of the spindle, accumulating elastic potential energy and damping the descent of the seat pan; and when the user stands up from the seat pan, the torsion spring releases the elastic potential energy to drive the spindle reversely and help the user to stand up.

1. When the chair with an elastic lifting seat pan according to an embodiment of the present invention application is used at its lowest position, it may be used as a conventional seat.

2. When the user needs assistance to stand up, the seat pan of the chair with an elastic lifting seat pan according to the embodiment of the present invention application may move from the lowest to the highest position, thereby helping the user to stand up.

3. When the user needs assistance to sit down, the seat pan of the chair with an elastic lifting seat pan according to the embodiment of the present invention application may move from the highest position to the lowest position and help the user to sit down slowly.

4. Whether sitting down or standing up, the seat pan trajectory is preset by transmitting component, in accordance with the needs of individual human physiological conditions of a user, so that the user feels comfortable.

5. The chair with an elastic lifting seat pan according to the embodiment of the present invention application is a passive device without any power supply. In the process of the user sitting down, the torsion spring plays a damping role, making the user feel comfortable, and the user's weight is converted to elastic potential energy for the torsion spring. In the process of the user to stand up, the torsion spring releases the elastic potential energy to help the user sit up, thereby reducing the physical effects of the user in the process of standing up.

6. In order to accommodate the needs of individual persons of different body weights, the chair with an elastic lifting seat pan according to the embodiment of the present invention application may also include a pre-stress adjustment mechanism, which is used to adjust the pre-stress of the torsion spring according to the user's body weight, so as to accommodate various different body weights of the users.

BRIEF DESCRIPTION OF THE DRAWINGS

In order to clearly illustrate the technical solution of the embodiments of the invention, the drawings of the embodiments will be briefly described hereinafter; and it can be understood that the described drawings are only related to some embodiments of the invention and thus are not limitative of the invention. These and/or other aspects and advantages of the invention will become apparent and more readily appreciated from the following description of the embodiments, taken in conjunction with the accompanying drawings.

DETAILED DESCRIPTION

In order to clearly illustrate the technical solution of the embodiments of the invention, the drawings of the embodiments will be briefly described hereinafter; and it can be understood that the described drawings are only related to some embodiments of the invention and thus are not limitative of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Now, the embodiments according to the present invention application will be described hereinbelow in connection with the accompanying drawings.

Figure 1:
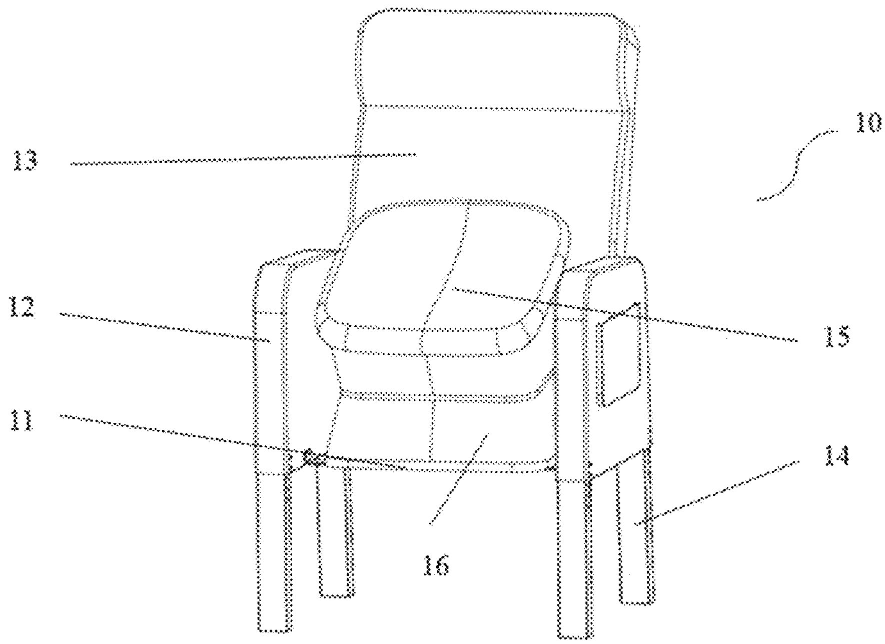
FIGS. 1, 2 and 3 are schematic diagrams of a chair with an elastic lifting seat pan according to an embodiment of the present invention application.
Figure 2:
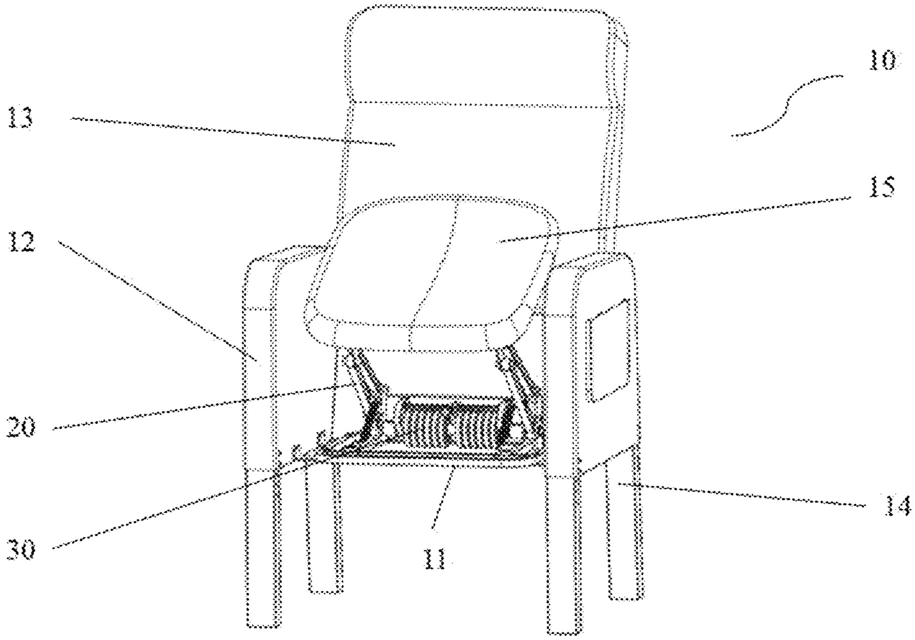
Figure 3:
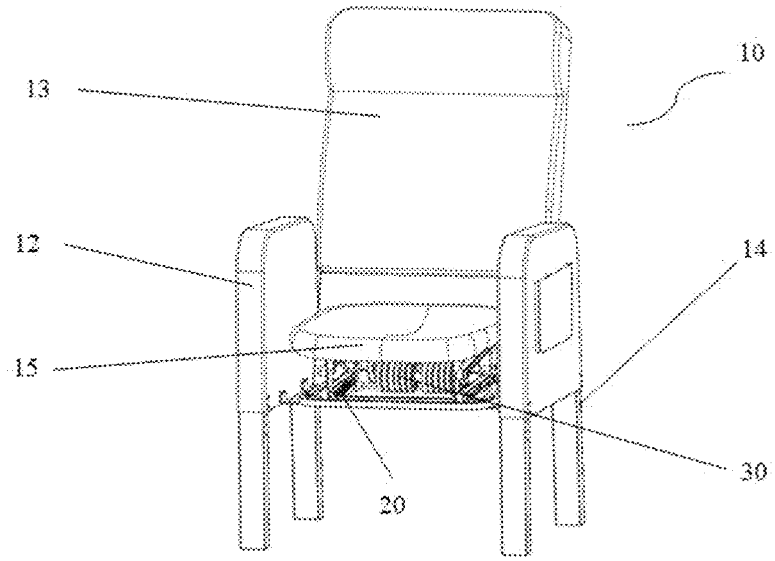

FIGS. 1, 2 and 3 illustrate schematic diagrams of a chair with an elastic lifting seat pan according to an embodiment of the present invention application.

As shown in FIGS. 1, 2 and 3, a chair with an elastic lifting seat pan according to an embodiment of the present invention application comprises a chair body 10, a transmitting component 20 and a driving component 30.

The chair body 10 may include, for example, a baseplate 11, a left armrest and a right armrest 12 firmly connected with the baseplate 11, a backrest 13 firmly connected with the left armrest and the right 12, legs and feet 14 supporting the baseplate 11, and a seat pan 15 which can be lifted and tilted relative to the baseplate 11. Although the chair with an elastic lifting seat pan according to the embodiment of this invention application shown in FIGS. 1-3 has the appearance of a general sofa, the embodiment of this application is not limited thereto, it may be various shapes of office seats, restaurant seats, cinema seats, bus seats, high-speed rail seats, airplane seats and applied to these occasions. Also, the chair body 10 shown has four chair legs 14, but the embodiment of the present invention application is not limited to this, the baseplate 11 of the chair body 10 may be supported by a universal wheel or other support modes.

As shown in FIG. 1, since the seat pan 15 can, perform lift and tilt movements relative to the baseplate 11, a variable space can be formed therebetween. For the purpose of appearance and protection, the chair body 10 may also include a flexible cover 16 wrapping around the seat pan 15 and the baseplate 11 and surrounding the space therebetween. The material and structure of the flexible cover 16 are not limited, for example, the structure of a telescopic bellows.

As shown in FIGS. 2 and 3, the transmitting component 20 may be provided on the upper surface of the baseplate 11 and can support the seat pan 15 to lift and tilt. The driving component 30 are the driving force of the transmitting component 20, which drives the movement of the transmitting component 20 by accumulating elastic potential energy and releasing elastic potential energy. Therefore, the chair with an elastic lifting seat pan according to the embodiment of the present invention application may be a passive seat, without any motor, battery or external power supply, and therefore is also an environmental friendly seat.

Figure 4:
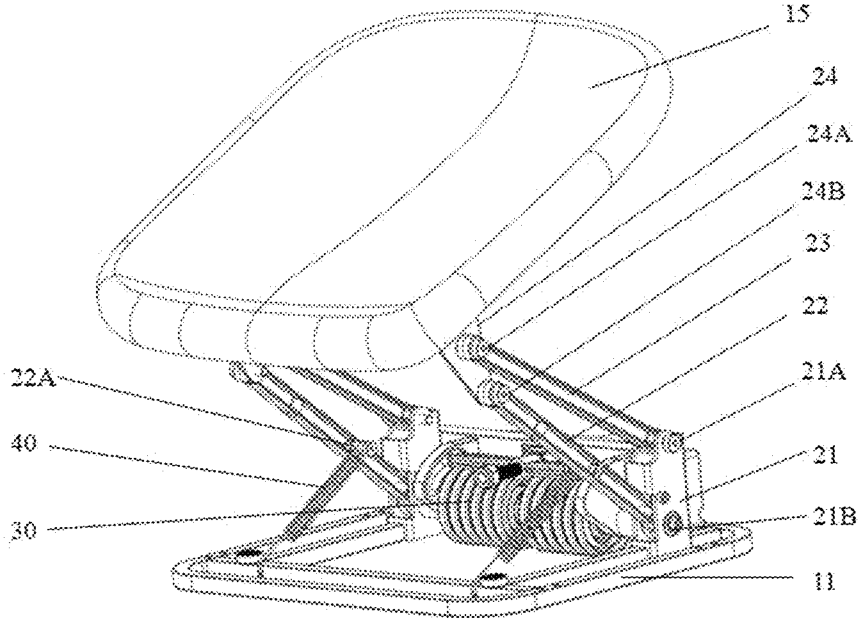
FIG. 4 is a schematic diagram illustrating the cooperative relationship of a baseplate, transmitting component, driving component, and a seat pan in the chair with an elastic lifting seat pan according to an embodiment of the present invention application.
Figure 5:
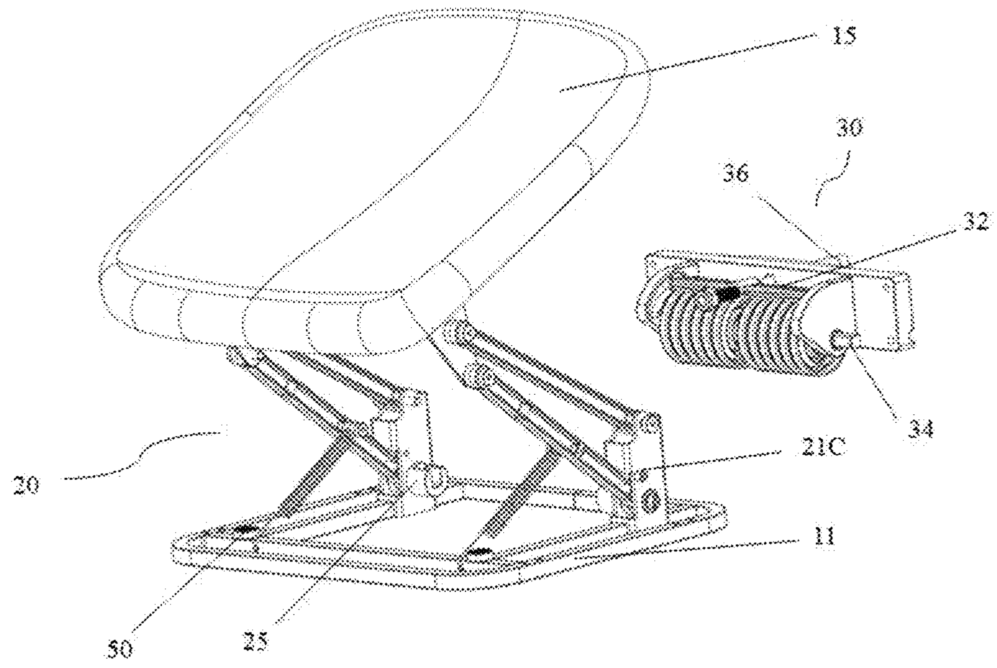
FIG. 5 is explosive diagram illustrating the cooperative relationship of the baseplate, the transmitting component, the driving component, and the seat pan in the chair with an elastic lifting seat pan according to an embodiment of the present invention application.

FIG. 4 is a schematic diagram illustrating the cooperative relationship of the baseplate, the transmitting component, the driving component, and the seat pan in the chair with an elastic lifting seat pan according to an embodiment of the present invention application. FIG. 5 is an explosive diagram illustrating the cooperative relationship of the baseplate, the transmitting component, the driving component, and the seat pan in the chair with an elastic lifting seat pan according to an embodiment of the present invention application.

As shown in FIGS. 4 and 5, the transmitting component 20 has a left and right symmetrical setting mode and structural features, and thus only one side structural features of the setting mode are described below as examples.

As shown in FIGS. 4 and 5, the transmitting component 20 includes a pair of hinge holders 21 extending up from the respective corners of the baseplate 11 near the backrest 13 and firmly connected to the baseplate 11. Each of the pair of hinge holders 21 may have an upper hinge seats 21A and a lower hinge holders 21B. The transmitting component 20 may also include a pair of driving links 22, and one of the two ends of the pair of driving links 22 is joined by a hinge with the lower hinge holders 21B of the pair of hinge holders 21 and must be key-in connected with the hinge shaft. In addition, the transmitting component 20 may also include a pair of guiding links 23, and one of the two ends of the pair of guiding links 23 is joined by a hinge with the upper hinge seats 21A of the pair of hinge holders 21. Further, the transmitting component 20 may also include a pair of link plates 24 having an upper hinge seat 24A, a lower hinge seat 24B, and a plane connecting seat 24C. The upper hinge seat 24A may be joined by a hinge with the other end of its corresponding guiding links 23, the lower hinge seat 24B is connected with the hinge of the other end of its corresponding driving links 22, and the plane connecting seat 24C of the pair of link plates 24 may be firmly connected with the seat pan 15.

As described above, the hinge holders 21, the driving links 22, the guiding links 23, and the link plates 24 are joined by the respective hinges to form a four-bar mechanism. In this four-bar mechanism, the hinge seats 21A and 21B of the pair of hinge holders 21 are firmly connected to the baseplate 11 and are immobile. Therefore, the driving links 22, the guiding links 23 and the link plates 24 are in linkage relationships. The four-bar mechanism is arranged symmetrically in a pair, and the plane connection seat 24C as an output end of the pair of link plates 24 is firmly connected to the bottom of the seat pan 15. Thus, the orientation of the seat pan 15, that is, lifting and backward tilt or rotation is changeable with movement of the four-bar mechanism. Because one end of the driving links 22 is key connected to the hinge shaft at the lower hinge holders 21B of the pair of the hinge holders 21, the links and the hinge shaft of the lower hinge holders 21B can follow the rotation of the hinge shaft of the hinge holders 21B when the orientation of the seat pan 15 changes; and conversely, the orientation of the linkage of the seat pan 15 may change when the driving links 22 and the hinge shaft of the lower hinge holders 21B rotate.

Further, the distance between the lower hinge seats 21 B and the upper hinge seats 21A of the hinge holders 21, the distance between the upper hinge seat 24A and the lower hinge seat 24B of the pair of the link plates 24, the length of the driving links 22 and the length of the guiding links 23 determine the linkage relationship of the four-bar mechanism. The change in the orientation of the plane connecting seat 24C or the connected seat pan 15 is associated with the distance to the upper hinge seat 24A of the link plates 24 and the angle of the connection line from the upper hinge seat 24A to the lower hinge seat 24B thereof as well as the linkage relationship of the four-bar mechanism.

Figure 6:
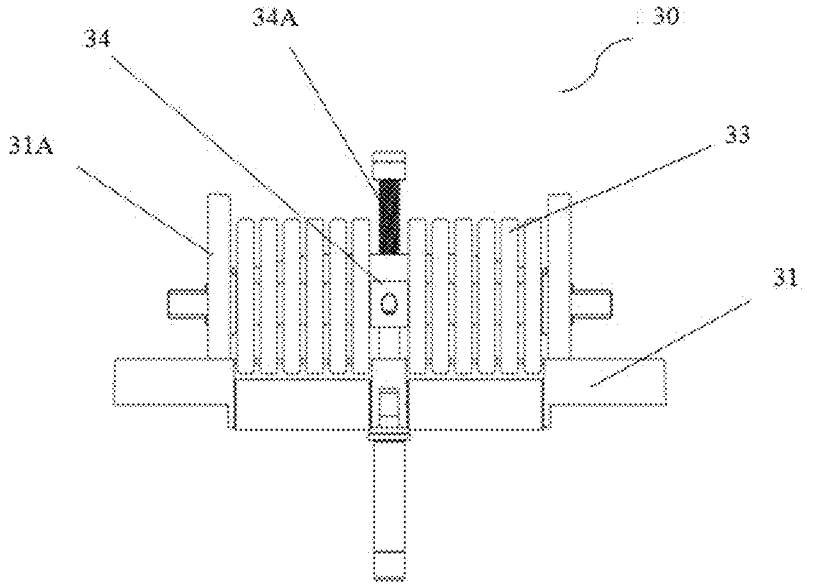
FIG. 6 is a main view illustrating the driving component in the chair with an elastic lifting seat pan according to the embodiment of the present invention application.
Figure 7A:
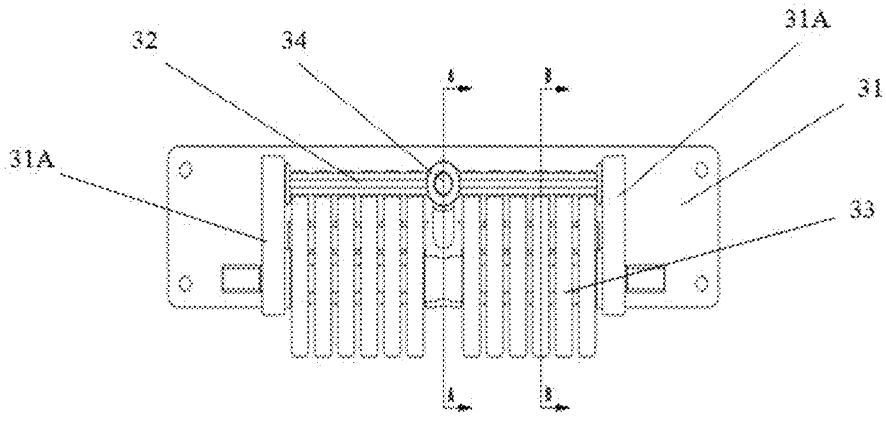
FIG. 7A is a planform illustrating the driving component in the chair with an elastic lifting seat pan according to the embodiment of the present invention application.
Figure 7B:
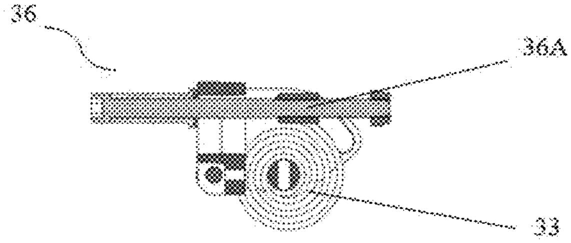
FIG. 7B is a sectional view along line A-A in FIG. 7A.

FIG. 6 is a main view illustrating the driving component in the chair with an elastic lifting seat pan according to the embodiment of the present invention application. FIG. 7A is a planform illustrating driving component in the chair with an elastic lifting seat pan according to the embodiment of the present invention application; FIG. 7B is a sectional view along line A-A shown in FIG. 7A; and FIG. 7C is a sectional view along with line B-B shown in FIG. 7A.

Figure 7C:
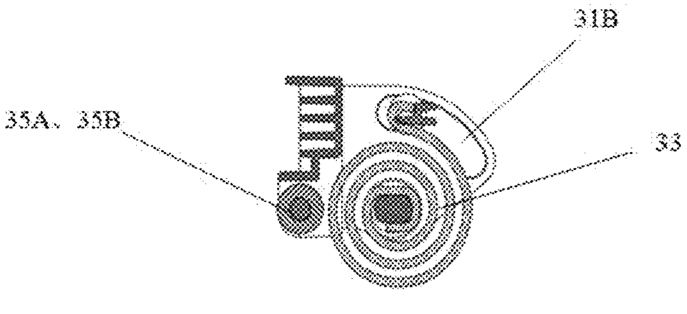
FIG. 7C is a sectional view along line B-B in FIG. 7A.

As shown in FIGS. 4, 5, 6, 7A-7C, the driving component 30 may include a chassis plate 31 having a pair of holders 31A extending vertically from one of its surfaces, and each of the pair of holders 31A includes a circular curved slider 31B. The chassis plate 31 may be firmly connected with the pair of hinge holders 21 of the transmitting component 20 as shown in FIG. 4. The driving component 30 also includes a cross beam 32 with its both ends inserted into the respective circular curved sliders 31B of the pair of the holders 31A so as to slide along the respective circular curved slider 31B as shown in FIGS. 5, 7A and 7C. The driving component 30 further includes at least one torsion spring 33 being arranged between the pair of holders 31A and including a central hole, a central end and a peripheral end. The peripheral end is hook connected with the cross beam 32 and a spindle 34 inserting into the central hole of the torsion spring 33, key connecting with the central end of the torsion spring 33, and having both ends thereof mechanically connected with the respective driving links 22 of the transmitting component 20 and the hinge shaft of the hinge seat 24B of the transmitting component 20.

Furthermore, the seat pan 15 may have a shape adapted to the chair body 10 and has a plane connecting seat fixed connections to the pair of link plates 24 of the transmitting component 20. When the user is seated on the seat pan 15, the torsion spring 33 follows with the rotation of the spindle 34, accumulating elastic potential energy and damping the descent of the seat pan 15. When the user needs to stand up from the seat pan 15, the torsion spring 33 releases elastic potential energy and drives the spindle 34 to help the user to stand up.

As shown in FIG. 5, according to an embodiment of the present invention application, the spindle 34 of the driving component 30 may have a rectangular cross section, and the central hole of torsion spring 33 may have a rectangular shape as well so as to form self-alignment key connection therebetween after the torsion spring 33 sockets on the spindle 34.

As shown in FIG. 5, according to an embodiment of the present invention application, the hinge shaft joining the driving links 22 and the hinge holders 21 in the transmitting component 20 may include a coaxial short shaft 25 with a rectangular groove, and the two ends of the spindle 34 may be inserted into the rectangular groove of the coaxial short shaft 25. The connection of the two ends of the spindle 34 to the hinge shaft is not limited to this, and may be connected in any suitable way, for example, a spline of the shaft.

In addition, the number of torsion spring 33 may be more than one, being uniformly arranged along with the spindle 34. Preferably, number of the torsion springs may be an even number, symmetrically arranged with the respect to midline of the spindle as the axis and set uniformly along the spindle 34.

As shown in FIGS. 5, 6, 7A and 7B, according to an embodiment of the present invention application, the chair with an elastic lifting seat pan may also include a torsional force adjustment mechanism 36 for adjusting torsional force of the torsion spring 33. The torsional force adjustment mechanism 36 may include an adjusting bolt 36A provided at the middle of the spindle 34 behind the chassis plate 31 against the chassis plate 31 and connecting the cross beam 32 through a thread connection.

According to an embodiment of the present invention application, the chair with an elastic lifting seat pan may also include a self-lubricating shaft 35A and a self-lubricating shaft sleeve 35B covering thereon, the self-lubricating shaft 35A is provided parallel to the spindle 34 between the spindle 34 and the chassis plate 31, and the two ends of the self-lubricating shaft 35A are fixed with the chassis plate 31. When the center of the outer ring of the torsion spring 33 with its neighboring rings deviates the axil of the spindle due to excessive force, the self-lubricating shaft sleeve 35B can match against the torsion spring outer ring to avoid its excessive deformation causing rub of neighboring rings.

According to an embodiment of the present invention application, the chair with an elastic lifting seat pan may also include a tensile damping spring 40 provided between the front edge of the baseplate 11 and the pair of driving links 22. Preferably, each of the driving links 22 may include a channel and a slider 22A received in the channel, and the tensile damping spring 40 may be connected to the driving links 22 by the slider 22A according to an embodiment of the present invention application.

According to an embodiment of the present invention application, the chair with an elastic lifting seat pan 15 may also include two stop pin 21C provided in the hinge seats as an upper limit of the driving links 22 and two soft adhesive pad limit blocks 50 provided on the upper surface of the baseplate 11 corresponding to the positions of the driving links 22.

According to an embodiment of the present invention application, the seat pan 15 may have an upper surface with a curved surface shaped of bionic human hips.

Figure 8:
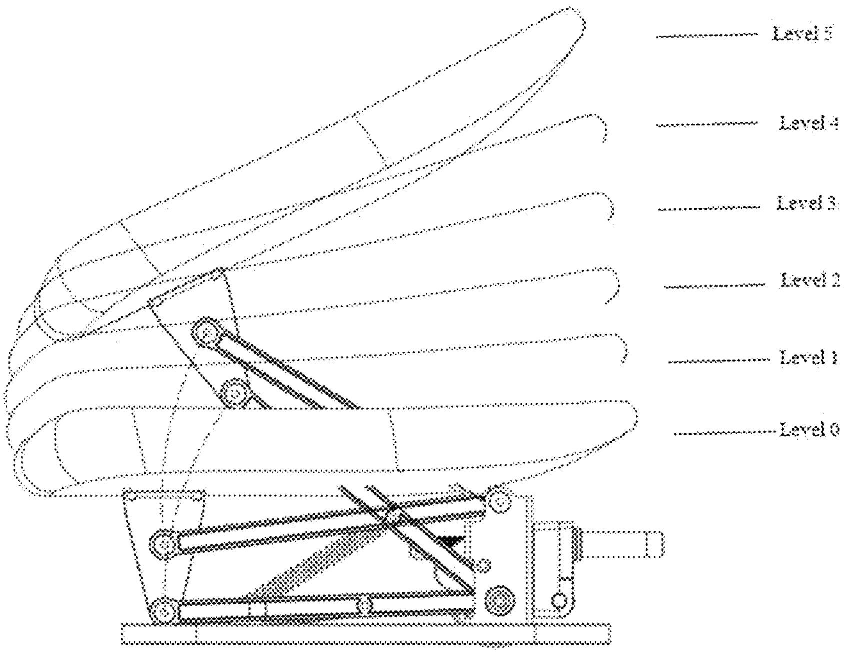
FIG. 8 is a schematic diagram illustrating relationship of the lowest position 0 and five lift positions 1-5 in the chair with an elastic lifting seat pan according to the embodiment of the present invention application.

FIG. 8 is a schematic diagram illustrating relation of the lowest position 0 and five lift positions 1-5 in the chair with an elastic lifting seat pan according to the embodiment of the present invention application.

As shown in FIG. 8, according to an embodiment of the present invention application, during the siting down, the seat pan 15 passes through the lift position 4, 3 and 2 from 5 (the highest position) to 0 (the lowest position). Otherwise, during the standing up, the seat pan 15 passes through positions 2, 3 and 4 from the position 0 (the lowest position) to the position 5 (the highest position).

According to an embodiment of the present invention application, lifting height of the seat pan from the lowest to the highest position may be 10-30 cm, and the angle change of the seat pan from the lowest to the highest position may be 20° to 35°.

Compared with the prior art, the chair with an elastic lifting seat pan according to an embodiment of the present invention application has at least the following beneficial technical effects.

A chair with an elastic lifting seat pan according to an embodiment of the present invention application may comprise a chair body, a transmitting component, a driving component and a seat pan. When the user is seated on the seat pan, the torsion spring is deformed with the rotation of the spindle, accumulating elastic potential energy and damping the descent of the seat pan; when the user stands up from the seat pan, the torsion spring releases elastic potential energy to drive the spindle reversely and help the user to stand up.

1. When the chair with an elastic lifting seat pan according to an embodiment of the present invention application is used at its lowest position, it may be used as a conventional seat.

2. When the user needs assistance to stand up, the seat pan of the chair with an elastic lifting seat pan according to the embodiment of the present invention application may move from the lowest to the highest position and help the user to stand up.

3. When the user needs assistance to sit down, the seat pan of the chair with an elastic lifting seat pan according to the embodiment of the present invention application may move from the highest position to the lowest position and help the user to sit down slowly.

4. Whether sitting down or standing up, the seat pan trajectory is preset by the transmitting component, in accordance with the needs of individual human physiological conditions, so that the user feels comfortable.

5. The chair with an elastic lifting seat pan according to the embodiment of the present invention application is a passive device without a power supply. In the process of the use sitting down, the torsion spring plays a damping role, making the user feel comfortable, and the user's weight is converted to elastic potential energy for the torsion spring. In the process of the user standing up, the torsion spring releases elastic potential energy to help the user to stand up, thereby reducing the physical effects of the user in the process of standing up.

6. In order to accommodate the use needs of individual persons of different body weights, the chair with an elastic lifting seat pan according to the embodiment of the present invention application may also include a pre-stress adjustment mechanism, which is used to adjust the pre-stress of the torsion spring according to the user's body weight, so as to accommodate various different body weights of the users.

What are described above is related to the illustrative embodiments of the invention only and not limitative to the scope of the invention; the scopes of the invention are defined by the accompanying claims.

What is claimed is:

1. A chair with an elastic lifting seat pan, comprising:

a chair body including a baseplate, a left armrest and a right armrest firmly connected with the baseplate, a backrest firmly connected with the baseplate and the left armrest and the right armrest, and legs and feet supporting the baseplate;

a transmitting component, including a pair of hinge holders respectively extending up from the baseplate at two corners of the baseplate near the chair back on left side and right side, firmly connecting with the baseplate respectively, and each of which has an upper hinge seat and a lower hinge seat, a pair of driving links, each of which is joined with the lower hinge seat at one end by a hinge respectively and the hinge is a key-in hinge, and a pair of guiding links, each of which is joined with the upper hinge seat at one end by a hinge respectively, and a pair of link plates, each of which there is an upper hinge seat and a lower hinge seat, each of the two upper hinge seats is joined with the other end of each guiding link by a hinge respectively, and each of the link plates includes a plane connecting seat on its upside;

a driving component, including a chassis plate to be firmly connected on the pair of hinge holders of the transmitting component with a pair of holders vertically extending from a surface of the chassis plate in which an circular curved slider is provided, a cross beam provided to plug into the circular curved slider of the holder at its two ends so as to slide along the circular curved slider, at least one torsion spring arranged between the pair of holders, having a central end with a central hole and a peripheral end firmly connected with the cross beam by a hook joint, and a spindle inserting into the central hole of the torsion spring to form a key connection with the torsion spring formed therebetween, and to form a coaxial mechanical connection at its two ends with the hinge axles of the lower hinge seats in the transmitting component; and a seat pan having a shape to fit the chair body and attached with the plane connecting seat of the pair of link plates in the transmitting component, wherein when the user is seated on the seat pan, the torsion spring is deformed with the rotation of the spindle, accumulating elastic potential energy and damping the descent of the seat pan; when the user stands up from the seat pan, the torsion spring releases the elastic potential energy to drive the spindle reversely and help the user to stand up.

2. The chair with an elastic lifting seat pan according to claim 1, wherein the spindle in the driving component is rectangular in cross section, and the central hole of the torsion spring also is rectangular, and thus a self-aligned structure is formed therebetween after the spindle is inserted into the torsion spring.

3. The chair with an elastic lifting seat pan according to claim 2, wherein the hinge shaft joining the driving links of the transmitting component and the hinge seats includes a coaxial short axis having a rectangular groove to receive the end of the spindle.

4. The chair with an elastic lifting seat pan according to claim 1, wherein there are a plurality of torsion springs uniformly arranged along with the spindle.

5. The chair with an elastic lifting seat pan according to claim 4, also including a torsional force adjustment mechanism for adjusting torsional force of the torsion spring or springs.

6. The chair with an elastic lifting seat pan according to claim 5, wherein the torsional force adjustment mechanism includes an adjusting bolt provided at the middle of the spindle behind the chassis plate against the chassis plate and connecting the cross beam through a thread connection.

7. The chair with an elastic lifting seat pan according to claim 1, also including a self-lubricating shaft and a self-lubricating shaft sleeve covering thereon, the self-lubricating shaft is provided parallel to the spindle between the spindle and the chassis plate, the two ends of the self-lubricating shaft are fixed with the chassis plate, when the center of the outer ring of the torsion spring with its neighboring rings deviates from the axis of the spindle due to excessive force, the self-lubricating shaft sleeve matches against the torsion spring outer ring to avoid its excessive deformation causing friction of the neighboring rings.

8. The chair with an elastic lifting seat pan according to claim 1, also including a tensile damping spring provided between the front edge of the baseplate and the pair of driving links.

9. The chair with an elastic lifting seat pan according to claim 8, wherein each of the driving links includes a channel and a slider received in the channel, and the tensile damping spring is connected to the driving links by the slider.

10. The chair with an elastic lifting seat pan according to claim 1, also including two stop pins provided in the hinge seats as an upper limit of the driving links and two soft adhesive pad limit blocks provided on the upper surface of the baseplate corresponding to the positions of the driving links.

11. The chair with an elastic lifting seat pan according to claim 1, wherein the seat pan has an upper surface with a curved surface shaped of bionic human hips.

12. The chair with an elastic lifting seat pan according to claim 1, also including a flexible cover surrounding the seat pan and baseplate and surrounding the space between them.

13. The chair with an elastic lifting seat pan according to claim 1, wherein lifting height of the seat pan from the lowest to the highest position is 10-30 cm, and angle change of the seat pan from the lowest to the highest position is 20° to 35°.

* * * * *